June 16, 1931.  G. D. SUNDSTRAND  1,809,949
MACHINE TOOL
Filed Feb. 27, 1928
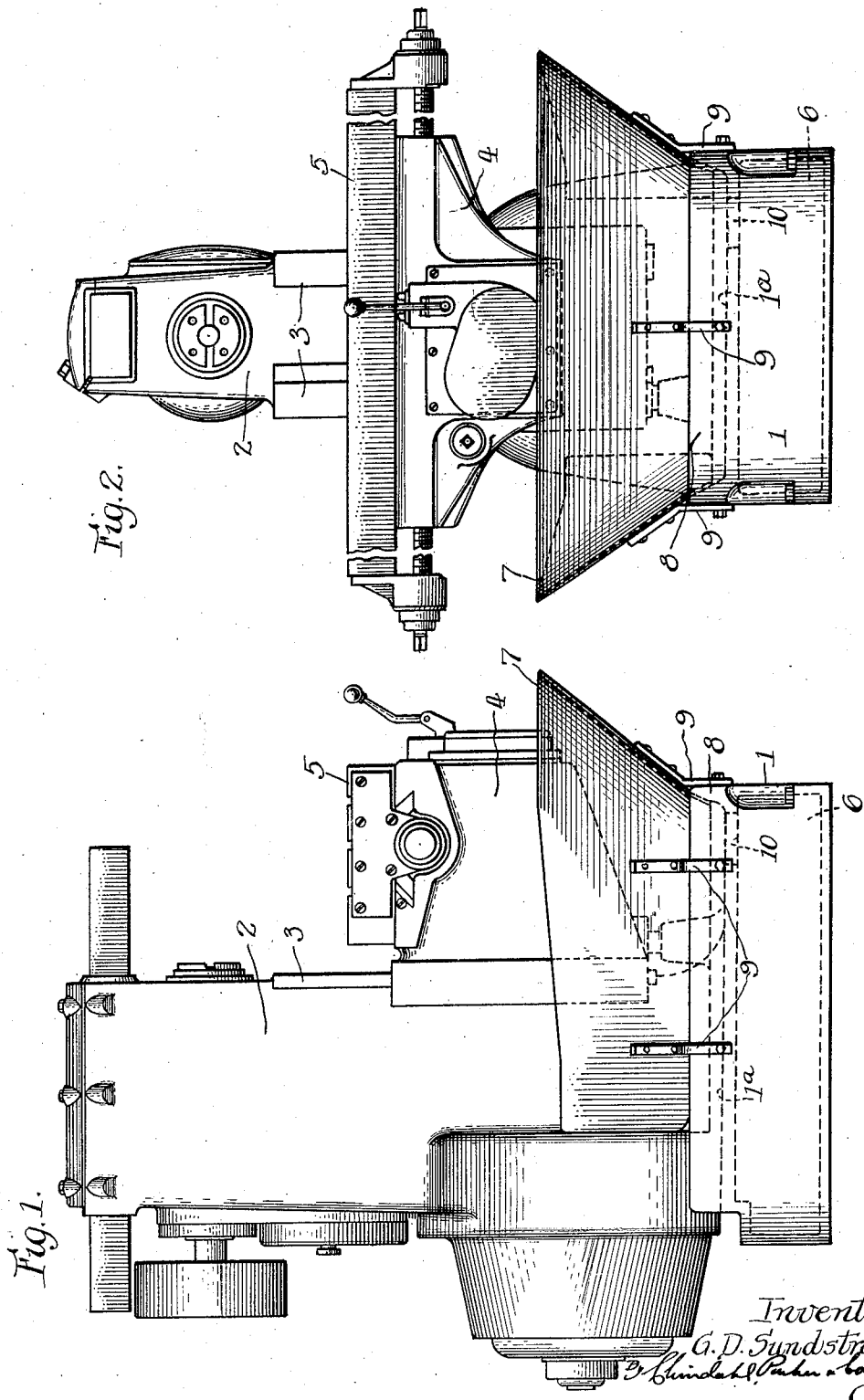
Inventor:
G. D. Sundstrand,
Attys.

Patented June 16, 1931

1,809,949

UNITED STATES PATENT OFFICE

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS

MACHINE TOOL

Application filed February 27, 1928. Serial No. 257,210.

The invention relates generally to machine tools and more particularly to a novel base construction therefor.

In constructions used heretofore a suitable base has been provided arranged primarily for properly supporting the column of the machine and for furnishing means for attaching the machine to the floor. In machines wherein provisions have been made for supplying cutter coolant, a coolant chamber has generally been positioned in the lower portion of the column and a drain passage provided from the work table to this chamber.

In production or manufacturing machines like those now used for finishing large quantities of work pieces in the shortest possible time, such large quantities of cutter coolant are used that coolant chambers of the character heretofore provided are not only inadequate to supply the necessary amount of coolant but also are ineffective properly to return all the coolant after it has been used and prevent it from being spilled on the floor.

It is the general object of the invention to provide an improved base construction for machine tools embodying a coolant chamber and effective means for draining used coolant into said chamber.

It is another object of the invention to produce a machine tool with a relatively high flat base of hollow construction with which the column is formed integrally and means for draining into the base cutter coolant which drips from the work support.

It is another object of the invention to provide a machine tool with a coolant chamber located in a flat base portion extending partly under the work support together with a drip pan arranged to catch cutter coolant from the work table.

A further object is to provide a machine tool having an improved base construction together with a detachable drip pan and novel means for mounting the pan on the base.

The present embodiment of the invention consists of a milling machine having a relatively high flat base section of hollow construction with a drain opening therein, a column uprising integrally from the rear portion thereof, a work support movable transversely across the front portion and a drip pan having inwardly sloping slides arranged to catch coolant from the work table and direct it onto the base.

Further objects and advantages of the invention will be understood from the following detailed description taken in connection with the accompanying drawings in which:

Fig. 1 is a side elevation of a milling machine embodying the invention in its preferred form.

Fig. 2 is a front elevation thereof.

For purposes of disclosure I have illustrated in the drawings and will hereinafter describe in detail the preferred embodiment of the invention in connection with a milling machine of the movable knee type, but it is to be understood that I do not intend to limit the invention to the particular construction and arrangements shown, it being contemplated that the invention may equally well be embodied in machines of the rigid knee type and that various other changes may be made by those skilled in the art without departing from the spirit and scope of the appended claims.

The invention in the exemplary form chosen for purposes of disclosure comprises a relatively high base portion 1, substantially rectangular in form, the column 2 of the machine preferably being formed integrally with the rear portion thereof.

As illustrated herein, the column 2 is provided with spaced vertical ways 3 along its forward side upon which a knee 4 is slidably mounted. A work support or table 5 is mounted upon the knee and above the forward portion of the base for movement transversely in front of the column. The base 1 is of hollow construction so as to form a cutter coolant chamber 6 of large capacity, located beneath the work table and other parts of the machine.

Although it is contemplated that drains of suitable construction may be provided for collecting that portion of the coolant which falls onto the table, the invention provides a means for collecting the coolant which flows off or is discharged over the sides of the table and would ordinarily fall on the floor.

This means is herein illustrated as comprising a drip pan formed of the top wall 1ª of the base and a shield or guard wall 7 positioned under the table portion of the machine with its lower edge resting upon the base and extending upwardly and outwardly from three sides of the base. Preferably the base is formed with an uprising wall or ledge 8 along its side and front edges so that the lower edge of the shield may be inserted within said ledge and detachably secured to the base by a plurality of brackets 9.

The exposed upper surface of the top wall 1ª of the base, i. e. the portion not covered by the column, is preferably inclined downwardly to a slight extent towards one corner in which a drain opening 10 is provided in the wall. Thus the coolant which overflows the work support 5 is caught by the shield 7 and the upper surface of the base and is drained back into the coolant chamber 6 through the opening 10. Inasmuch as the usual pump and filtering device and also the construction of suitable supply conduits are well known in the art, they are not illustrated herein.

The milling machine disclosed is of a particularly advantageous construction and provides for draining into the coolant chamber by gravity, all of the coolant discharged onto the cutter. The drip pan is effective to prevent any coolant from reaching the floor and although readily detachable, is provided with a simple and effective means for securing it to the base.

I claim as my invention:

1. In a machine tool, the combination of a base, box-like in character, provided with an upstanding wall along the front and side edges thereof, a work support above the front portion of said base, and a sheet metal shield extending along the front and the two sides of said base, said shield having inwardly and downwardly sloping sides positioned with its lower edge within and attached to said wall so as to be supported thereby and arranged to catch cutter coolant which falls from the work support.

2. In a machine tool, the combination of a hollow rectangular base providing a coolant chamber therein and having a column extending upwardly from the rear portion thereof, the upper surface of said base having a drain opening therein and the remainder of the upper surface of the base sloping downwardly towards said opening, an upstanding ledge along the front and side edges of the base, and a shield extending along the front and sides of said base and having downwardly and inwardly sloping sides positioned with its lower edge within said ledge so as to be supported thereby.

In testimony whereof, I have hereunto affixed my signature.

GUSTAF DAVID SUNDSTRAND.